July 25, 1967     G. BAUMANN     3,333,123

MAGNETOGASDYNAMIC GENERATOR WITH COOLED DUCT WALLS

Filed Feb. 10, 1964

INVENTOR.
Gustav Baumann
BY
Pierce, Scheffler & Parker
attorneys 3,333,123
MAGNETOGASDYNAMIC GENERATOR WITH
COOLED DUCT WALLS
Gustav Baumann, Gebenstorf, Aargau, Switzerland, assignor to Aktiengesellschaft Brown, Boveri & Cie., Baden, Switzerland, a joint-stock company
Filed Feb. 10, 1964, Ser. No. 343,727
Claims priority, application Switzerland, Feb. 21, 1963, 2,169/63
3 Claims. (Cl. 310—11)

The present invention relates to magnetogasdynamic generators for producing electrical energy by passing a hot ionized gas through a duct, the duct containing one or more sets of spaced electrodes between which the gas passes and there also being provided an electromagnetic field which is passed through the duct at a right angle to the direction of flow of the gas and also at a right angle to the axis between the electrodes.

As is known, the ionized gas currents are highly heated, e.g. in the region of 3000° K. and are passed at a high velocity through the duct. Because of this high heat factor, the duct walls must be cooled down to a practical value by suitable means having regard for the particular materials from which the duct is made. Water is often used as the coolant, and in particular, feed water for a steam-circulating system.

It is known to build up the duct walls from a large number of coolant-carrying pipes arranged side-by-side substantially in a direction perpendicular to the axis of the duct in an attempt to attain uniform feed and heat absorption, but certain difficulties are involved in doing this. The pipes are protected from corrosion and excessive temperatures by ceramic coatings on the gas side. This solution has the disadvantage that undular formation of the surface on the gas side leads to increased losses in pressure.

The particular problem with which the present invention is concerned is to pass the coolant in heat transfer relation with the generator duct in a simple and satisfactory manner and at the same time minimize the pressure loss in the gas flow. In accordance with the invention, this problem is solved by utilizing cooling pipes for the duct walls, these cooling pipes being disposed substantially parallel to the direction of gas flow through the generator, and the cooling pipes having an increasing cross section in the direction of gas flow. A particular advantageous result is obtained if the pipes increase in external diameter at the same ratio as the increase in cross section of the duct. It is also advantageous to vary the wall thickness of the cooling pipes over their length with regard to the widely differing temperatures within the generator. This enables the cooling pipes to be adapted to the differing thermal and mechanical stresses which arise along the duct. Besides better cooling, this results in a saving in material which also reflects a saving in weight as well as cost.

A further advantageous arrangement of the generator construction in accordance with the invention is one wherein the generator is located vertically, i.e. passage of the hot ionized gas through the duct is in a vertically upward direction and the initially liquid coolant becomes at least partially vaporized as it also passes upward along the duct.

The foregoing objects and advantages of the invention will become more apparent from the following detailed description of a representative embodiment of the invention and from the accompanying drawings wherein.

Figure 4:
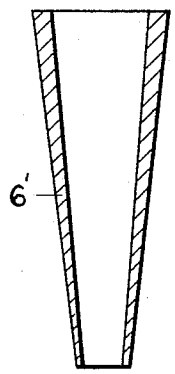
Figure 5:
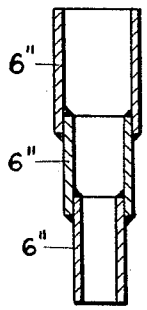

FIG. 4 is a longitudinal central section drawn at an enlarged scale of one of the coolant-carrying pipes wherein the wall thickness of the pipe is gradually increased from one end to the other; and FIG. 5 is a view similar to FIG. 4 showing a modified pipe construction wherein each pipe is constituted by a plurality of pipe sections arranged seriately, the sections having progressively increasing diameters.

With reference now to the drawings, the magnetogasdynamic generator is seen to be located in a vertical attitude, there being a lower combustion chamber 1 which forms a base for the generator which receives fuel through an inlet 2 and preheated combustion air through a second inlet 3. The hot ionized gases produced by the combustion chamber are delivered upwardly for flow through the duct 4 and pass through a transversely extending magnetic field and between spaced electrodes on which an electrical potential is developed. The magnetic field and spaced electrodes being conventional and not necessary for an understanding of the invention have been omitted in the interest of simplifying the disclosure. The ionized gases give up a part of their energy by the conversion into electrical energy as they pass through the duct and leave the latter at 5.

The walls of the duct are constituted by an assembly of cooling pipes 6, there being a feed-in manifold for the coolant, constituted by an annular conduit 7 connected to the lower ends of the pipes, the coolant entering at 8, and a discharge manifold for the coolant constituted by another annular conduit 9 connected to the upper ends of the pipes, the coolant being discharged at 10.

As is readily apparent from the drawings, the cooling pipes lie substantially parallel to the direction of gas flow through the duct, with the result that the coolant is passed through them in simple fashion and with clear flow conditions. The duct may also include a ceramic coating 11 on the sides of the pipes facing the hot gaseous fluid which also in this case forms an undular surface but the undulations are now disposed in the direction of the gas flow, with the result that they offer less resistance to it, and also the gas loses less heat to the duct walls so that the latter are less heavily stressed by heat.

Figure 1:
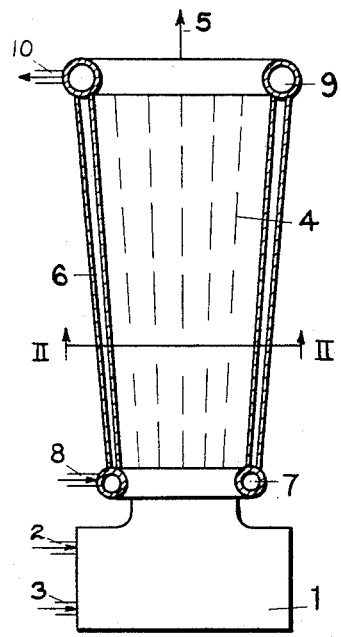
FIG. 1 is a view of the improved generator partly in central vertical section.
Figure 2:
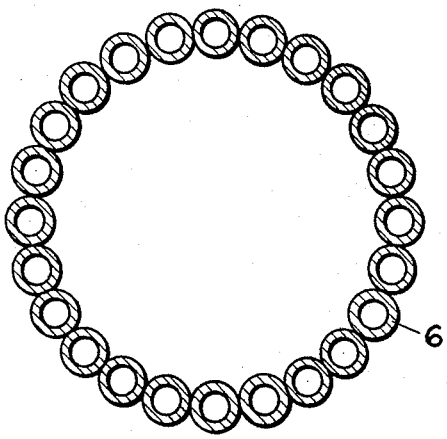
FIG. 2 is a transverse section taken on line II—II of FIG. 1 and showing the circumferential arrangement of the coolant-carrying pipes.
Figure 3:
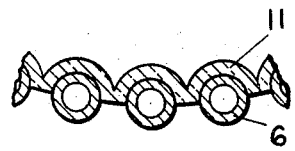
FIG. 3 is a transverse section showing a part of the duct wherein the pipes on their sides facing the hot gases are provided with a protective ceramic coating.

In the illustrated embodiment, the cross section of duct 4 increases in the direction of gas flow through it, the increase as depicted being uniform throughout the length of the duct so that the latter has an essentially tapered configuration. Due to this, the use of cooling pipes having a uniform bore throughout their length would have to be offset with respect to each other at the inlet end of the duct so that there would be no spaces between them as the cross section of the duct increases. Such a lay-out for the cooling pipes would indeed be structurally possible, but there would then be no simple means either of making all of the pipes absorb heat uniformly or of attaining a uniform cooling action on the duct lining. For this reason, and in accordance with a major object of the invention, cooling pipes having an increasing cross section in the direction of gas flow through the duct are used. It is advantageous for the cooling pipes to increase in external diameter in at least substantially the same ratio as the increase in cross section of the duct. This makes it possible, for example, to dispose the pipes together in touching relation over the whole length of the duct and thereby avoid any spaces between adjacent pipes. This is evident from an inspection of FIG. 2.

The cross-section of the pipes can be made to increase either in a gradual manner from one end to the other or in steps. FIG. 4 illustrates one practical arrangement wherein each pipe 6' is progressively tapered from one end to the other so that both the internal and external diameters of the pipe become progressively larger in the direction of gas flow through the duct formed by the pipe assembly. In this embodiment, it will also be noted that the wall thickness of the pipe gradually increases from the small end to the larger end of the tube.

FIG. 5 illustrates another practical arrangement wherein each pipe is constituted by a plurality of pipe sections 6" arranged seriately, it being noted that the pipe sections have progressively increasing diameters and that the inner diameter of one pipe is substantially the same as the external diameter of an adjacent pipe section so as to permit the pipe sections to be assembled in an essentially telescoped manner.

In order to take into account the increase in volume of the coolant occasioned by its heating as it passes along the pipes it is expedient for the coolant to flow through the pipes from the smaller to the larger cross section, i.e. in the same direction as the gas flow. It is also advantageous to vary the wall thickness of the cooling pipes over their length in recognition of widely differing temperatures in the generator. This enables the pipes to be adapted to the differing thermal and mechanical stresses along the duct. Beside better cooling, this results in a savings in material, with an attendant beneficial reduction in weight and cost.

It will be seen from the drawing, that the generator is placed in a vertical position. This permits the entire installation to be planned so as to save space and make use of exhaust heat, while at the same time enabling the very hot duct walls to be satisfactorily supported. Cooling pipes disposed parallel to the gas flow are also best suited to such an arrangement. In this connection it is immaterial in principle whether the direction in which the gases, and thus also the coolant, flow is from top to bottom or vice versa. However, if the coolant besides being heated is also at least partially vaporized, as may occur, for example, when water is utilized as the coolant, the flow of the coolant will become unstable if it is in the direction from top to bottom. In such a case, the combustion chamber is arranged at the bottom so that the ionized gas and coolant flow from the bottom to the top of the duct.

In conclusion, while in accordance with the patent statutes a preferred embodiment of the invention has been described and illustrated, it is to be understood that various modifications may be made in the construction and arrangement of its components without, however, departing from the spirit and scope of the invention as defined in the appended claims.

I claim:
1. In a magnetogasdynamic generator wherein a high velocity hot ionized gaseous fluid is passed longitudinally through a duct containing a transversely extending magnetic field and spaced electrodes to produce an electrical potential between said electrodes, the improvement wherein the walls of said duct are constituted by an assembly of cooling pipes through which a fluid coolant is passed, said pipes being disposed substantially parallel to the direction of gas flow through the duct, and the internal and external diameters of each pipe as well as the wall thickness thereof increasing progressively in the direction of flow of the gaseous fluid through the duct.

2. In a magnetogasdynamic generator wherein a high velocity hot ionized gaseous fluid is passed longitudinally through a duct containing a transversely extending magnetic field and spaced electrodes to produce an electrical potential between said electrodes, the improvement wherein the walls of said duct are constituted by an assembly of cooling pipes through which a fluid coolant is passed, said pipes being disposed substantially parallel to the direction of gas flow through the duct, and each said pipe in said assembly being constituted by a plurality of pipe sections arranged seriately, said pipe sections having progressively increasing diameters in the direction of flow of the gaseous fluid through the duct.

3. A magnetogasdynamic generator as defined in claim 2 wherein the internal diameter of one section of a pipe is substantially equal to the external diameter of an adjacent pipe section and the pipe sections are assembled with their end portions each fitted within the other.

References Cited
UNITED STATES PATENTS

| | | | |
|---|---|---|---|
| 2,958,183 | 11/1960 | Singlemann | 60—35.6 |
| 3,120,101 | 2/1964 | Beehr | 60—35.6 |
| 3,178,596 | 4/1965 | Brogan | 310—11 |
| 3,219,852 | 11/1965 | Brill | 310—11 |
| 3,239,697 | 3/1966 | Stekly | 310—11 |

MILTON O. HIRSHFIELD, *Primary Examiner.*

D. X. SLINEY, *Assistant Examiner.*